Dec. 25, 1956           V. IVORY           2,775,491
TRACK LAYING BELT FOR A CRAWLER TYPE VEHICLE
Filed Jan. 15, 1954           2 Sheets-Sheet 1
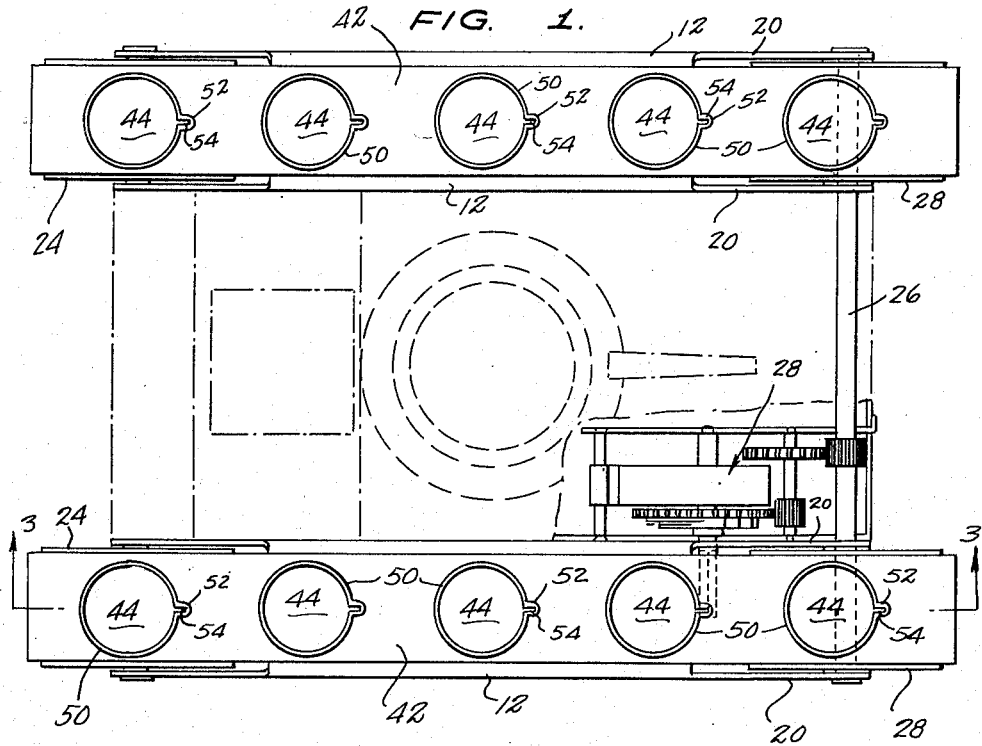
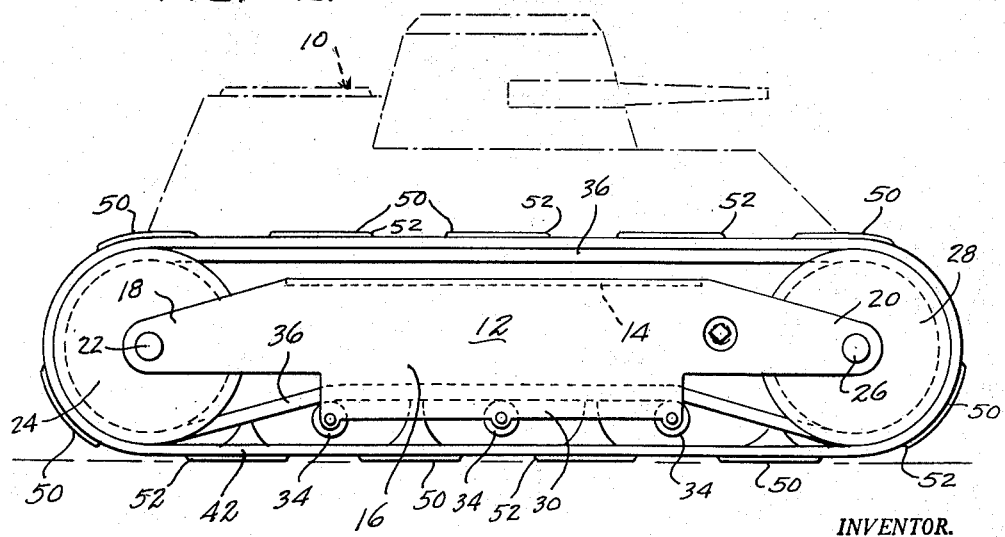
INVENTOR.
VERGE IVORY,
BY
McMorrow, Berman + Davidson
ATTORNEYS.

Dec. 25, 1956  V. IVORY  2,775,491
TRACK LAYING BELT FOR A CRAWLER TYPE VEHICLE
Filed Jan. 15, 1954  2 Sheets-Sheet 2
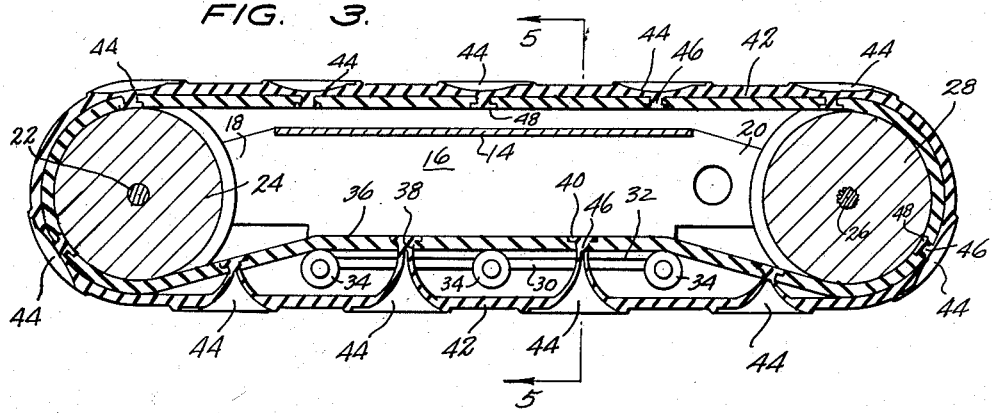
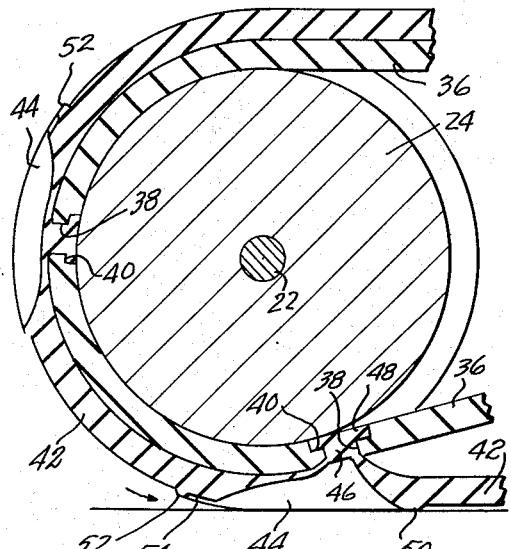
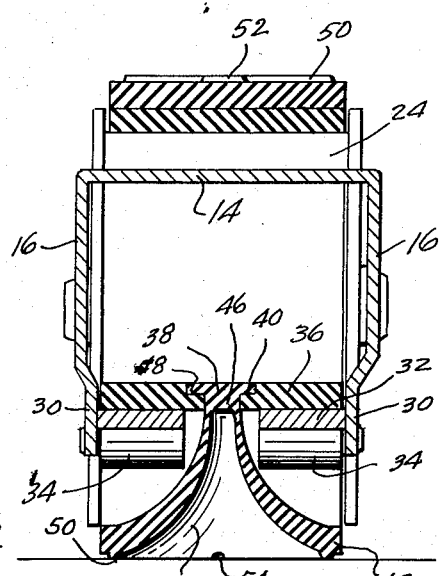
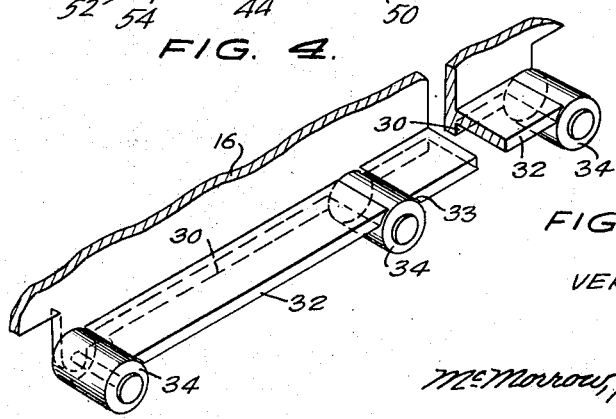
INVENTOR.
VERGE IVORY,
BY
McMorrow, Berman + Davidson
ATTORNEYS.

United States Patent Office 2,775,491
Patented Dec. 25, 1956

2,775,491

TRACK LAYING BELT FOR A CRAWLER TYPE VEHICLE

Verge Ivory, Oakland, Calif.

Application January 15, 1954, Serial No. 404,285

3 Claims. (Cl. 305—9)

This invention relates to a track laying belt for a crawler type vehicle and more particularly to a toy vehicle simulating a tank, a farm tractor or the like.

In the operation of vehicles of the crawler type employing endless track laying belts, and particularly toy vehicles of the type simulating larger vehicles, slippage between the track laid by the vehicle and the surface being traversed frequently occurs so that the operation of the vehicle is impaired.

The primary object of this invention is to avoid slippage between the crawler type track for a toy vehicle and the surface being traversed in order to preserve the realistic performance of the vehicle.

Another object is to create in the belt which contacts the surface being traversed spaced areas in which the air is rarified to set up a pressure differential between the belt and the surface being traversed which will cause the belt to hug the surface.

Another object is to facilitate the breaking of the vacuum created in the belt or tread as it is moved upwardly after it has completed a cycle of operation.

The above and other objects may be attained by employing this invention which embodies among its features an endless tread mounted to move in an elongated closed path in contact with a surface, vacuum cups carried by the tread for movement thereby in contact with said surface and means carried by the tread and operatively connected to the vacuum cups for increasing the volumetric capacity thereof while they are in contact with the surface.

Other features include hollow lips carried by the respective vacuum cups and projecting outwardly therefrom in longitudinal alignment with the longitudinal axis of the tread to initially break the vacuum between the vacuum cups and the surface being traversed as the tread moves upwardly about a supporting pulley or wheel.

In the drawings:

Figure 1 is a top plan view of the toy vehicle simulating a tank showing a portion thereof broken away to illustrate the propelling mechanism thereof;

Figure 2 is a side view of the toy illustrated in Figure 1;

Figure 3 is a sectional view taken substantially on the line 3—3 of Figure 1;

Figure 4 is an enlarged fragmentary sectional view of the idler wheel over which the traction belt is trained; and Figure 5 is an enlarged sectional view taken substantially on the line 5—5 of Figure 3.

Figure 6 is a fragmentary perspective view, with parts broken away and in section, of the flange and roller assembly of Figure 3.

Referring to the drawings in detail, this improved toy which may simulate a tank designated generally 10 comprises spaced parallel side frames 12, each comprising a channel having a web 14 and depending side flanges 16 having longitudinally extending legs 18 and 20 at opposite ends which project longitudinally from the channel 12 in spaced parallel relation and mounted in the legs 18 adjacent the ends thereof remote from the channel 12 is an axle shaft 22 upon which is mounted for rotation an idler pulley 24. A drive shaft 26 is journaled in the forwardly extending legs 20 of the channels 12 and this shaft extends between the legs 20 and between the respective channels 12 to cause the drive rollers or pulleys 28 mounted on the shaft 26 between the pairs of legs 20 of the respective channels to rotate in unison. A suitable spring motor 28 is operatively connected with the drive shaft 26 for causing the pulley 28 to rotate in a direction to propel the vehicle 10 along a surface. The structure so far described is conventional in many types of toy vehicle and forms no part of this invention except in combination therewith.

Carried by and depending from the lower edges of the side flanges 16 of the channels 12 are supporting flanges 30 carrying inwardly extending guide and supporting flanges 32, the purpose of which will hereinafter appear. In the preferred form of the invention guide and supporting rollers 34 are carried in longitudinally spaced relation by the supporting flanges 30 with the upper peripheral portion of the intermediate roller 34, Figures 3 and 6, extending through the slot 33 formed in the flange 32, the upper peripheral portion of the roller 34 at each end of the flange 32 projecting above the adjacent end of the flange 32.

Mounted on the pulleys 24 and 28 for movement in an elongated closed path is an endless traction belt 36 having extending therethrough at longitudinally spaced intervals openings 38 which are surrounded on the side of the belt which contacts the rollers with countersinks 40.

Extending around the traction belt 36 for movement therewith in an elongated closed path is an endless tread 42 having longitudinally spaced vacuum cups 44 in its outer surface which are adapted to contact the surface being traversed to cause the tread to adhere to said surface. Carried by each vacuum cup 44 and extending through an opening 38 in the tread is a neck 46 carrying a head 48 which engages against the bottom wall of the adjacent countersink 40, as will be readily understood upon reference to the drawings. Formed on the tread 42 in surrounding relation with each vacuum cup 44 is a rib 50 and projecting longitudinally from each rib 50 is a wall 52 defining a channel 54 which opens into the adjacent vacuum cup so that as the tread 42 moves away from the surface being traversed in following the curvature of the idler pulley 24, the passage 54 will break the vacuum within its respective cup 44.

As illustrated in the drawings, the lower run of the traction belt 36 is guided over the inwardly extending guide flanges 32 and rollers 34 so that during the period that the tread 42 is in contact with the surface being traversed, the traction belt 36 will be separated from the tread to extend the vacuum cups 44, as illustrated in Figures 3 through 5, inclusive, to increase the volumetric capacity thereof and thereby cause the tread to hug the surface. Obviously, by thus improving the grip of the tread on the surface being traversed, any slippage between the tread and the surface will be overcome and the full tractive force of the tread will be exerted to move the implement upon which it is used.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a toy vehicle of the crawler type, frame means including a pair of laterally spaced side frames; rollers rotatably mounted on the ends of the respective frames; an endless traction belt trained about the rollers of each frame; an endless tread overlying said belt and trained therewith about said rollers, said tread including supporting-surface-engaging vacuum cups spaced about the full circumference thereof and said cups including elongatable necks connected to the traction belt, and means on each side frame for separating the belt and tread for a portion of the circumferences thereof, whereby to elongate said necks and in this manner increase said capacity of the cups.

2. In a toy vehicle of the crawler type, frame means including a pair of laterally spaced side frames; rollers rotatably mounted on the ends of the respective frames; an endless traction belt trained about the rollers of each frame; an endless tread overlying said belt and trained therewith about said rollers, said tread including supporting-surface-engaging vacuum cups spaced about the full circumference thereof and said cups including elongatable necks connected to the traction belt, and means on each side frame for separating the belt and tread for a portion of the circumferences thereof, whereby to elongate said necks and in this manner increase said capacity of the cups, comprising laterally spaced guide flanges on each side frame extending between the belt and tread to separate said portions, said necks extending through the space between the flanges.

3. In a toy vehicle of the crawler type, a frame; rollers rotatably mounted upon said frame; and an endless tread trained about said rollers and including a series of supporting-surface-engaging vacuum cups each of which is formed medially between the opposite edges of the tread with a channel communicating with the interior of the cup and projecting radially outwardly from the cup in position to break the vacuum within the cup as the tread moves out of engagement with the supporting surface during movement of the vehicle over said surface.

References Cited in the file of this patent
UNITED STATES PATENTS

| | | |
|---|---|---|
| 1,828,288 | Marx | Oct. 20, 1931 |
| 1,914,546 | Berger | May 30, 1933 |